Jan. 23, 1962  E. B. GRAVES ETAL  3,018,375
VIEWING APPARATUS FOR AMPLIFIED X-RAY IMAGES
Filed Nov. 19, 1959  3 Sheets-Sheet 1

INVENTORS
EDWARD B. GRAVES &
EDGAR J. BASTIN
BY
Watts, Edgerton, Pyle & Fidler
ATTORNEYS Jan. 23, 1962  E. B. GRAVES ETAL  3,018,375
VIEWING APPARATUS FOR AMPLIFIED X-RAY IMAGES
Filed Nov. 19, 1959  3 Sheets-Sheet 2

INVENTORS
EDWARD B. GRAVES &
EDGAR J. BASTIN
BY
ATTORNEYS

INVENTORS
EDWARD B. GRAVES &
EDGAR J. BASTIN

ATTORNEYS 3,018,375
Patented Jan. 23, 1962

3,018,375
VIEWING APPARATUS FOR AMPLIFIED X-RAY IMAGES
Edward B. Graves, South Euclid, and Edgar J. Bastin, Chesterland, Ohio, assignors to Picker X-Ray Corporation, Waite Mfg. Div., Inc., Cleveland, Ohio, a corporation of Ohio
Filed Nov. 19, 1959, Ser. No. 854,205
13 Claims. (Cl. 250—77)

This invention pertains to X-ray apparatus and more particularly to an X-ray apparatus of the type wherein an amplified image is employed.

In recent years mechanisms known as image amplification tubes have become well recognized as useful tools in conducting X-ray studies. These amplification tubes are included in X-ray equipments for such diverse applications as diagnostic work by physicians and industrial inspection. One such apparatus is disclosed in United States patent application Ser. No. 750,531, filed July 23, 1958, under the title "Combined Image Amplifier and Fluoroscopic Screen Above X-Ray Examination Table."

With such an amplification apparatus, an X-ray beam is directed at an object being studied. A fluorescent screen or the like is positioned to provide a visual image of the X-rayed object. The fluorescent image excites the cathode of an image amplification tube. Electrons released by the cathode are accelerated by the tube to bombard the anode or image output end of the tube. The output end emits an amplified image.

This amplified image is then transmitted through an observation system which is either: (1) an optic system which transmits to an operator observable position; (2) a television system which transmits to any number of monitors where a television picture of the object being studied is displayed; or (3) a photographic system which utilizes a cine-fluorographic camera. In some instances attempts have been made to direct the image simultaneously to the three mentioned observation systems or to a selected two of the three.

The present invention is directed to an X-ray unit which provides an optic system, a television system, and a cine-fluorographic camera system. A novel and simplified structure is provided, wherein the three systems are carried in and by a simple compact carriage. The structure provides a pivot support for a television (or TV) pickup. The pickup may be selectively positioned either in a storage position or in an image transmission position where the image receiving end of the pickup is positioned between the image output end of the tube and the camera and optic systems.

Further, with this new arrangement, a part of the optic system is shifted out of the way as the TV pickup is moved into the image position. This shifting of a part of the optic system contributes to the compactness of the novel structure.

The structure also includes a selection arrangement wherein a beam splitter and a mirror are mounted on a movable carriage, and the mirror or the beam splitter forms a part of the optic system and is positioned over the output end of the image tube. The cine-fluorographic camera is mounted in line with the image tube. The beam splitter-mirror carriage is positioned between the camera and the tube. When the mirror is positioned over the tube, the camera is blocked from the image and all of the tube output is reflected through the optic system. When the beam splitter is over the tube, a portion of the light output is directed to the camera and the remainder is reflected through the optic system.

Accordingly, one of the principal objects of this invention is to provide a novel and improved image amplification system for use with an X-ray mechanism wherein optic, television, and cine-fluorographic systems are all provided and wherein at least the pickups of each of the systems is contained within a simple compact and unitary structure.

A related object of the invention is to provide a novel and improved mechanism wherein both the camera and the optic systems are inoperative when the television pickup is in the image receiving position.

Another object of the invention is to provide a novel and improved mechanism wherein the television pickup is adjustably carried in the mechanism and wherein an operator controlled adjustment mechanism is provided to selectively shift the television pickup from a storage to an image position and return.

A similar and related object of the invention is to provide a novel and improved mechanism made in accordance with the preceding object wherein a part of the optic system is shifted from an image transmitting to a storage position simultaneously as the television pickup is shifted from a storage to an image position.

Another object of the invention is to provide a novel and improved mechanism where an adjustable member is provided to permit either a mirror or a beam splitter to be selectively positioned in the path of an output image.

A similar object is to provide a mechanism made in accordance with the foregoing object wherein the beam splitter is positioned in line with the output of the image tube before the television pickup can be moved from the storage to the image position to assure the shortest possible time in shifting from TV to camera.

Another object of the invention is to provide a mechanism wherein the television pickup includes an image receiving portion which, when in the image position, is between the image output end of the tube and the optic system to absorb substantially all of the output energy from the image amplification tube.

Still another object of the invention is to provide a rotatable operator controlled adjustment means which is engageable with an optic system carriage supporting the mirror and beam splitter to position a selected one of the mirror and the beam splitter in the path of the output of an image tube and wherein the adjustment member is selectively engageable with the television pickup to adjust it from its storage to its image position and return.

A more special object of the invention is to provide a novel and improved mechanism made in accordance with one or all of the foregoing objects wherein a plurality of microswitches are mounted on the mechanism with selected ones of the group of switches being actuated as operator controlled adjustments are made, and wherein actuations of these microswitches control suitable mechanisms to control the output of the X-ray tube.

Another specialized object of the invention is to provide a novel and improved mechanism in which the optic system includes a pivotally mounted lens, and wherein the pivotally mounted lens shifts to a storage position as the TV pickup is shifted into its image position and wherein the lens is returned to its image position as the TV pickup is shifted to a storage position to provide for a more compact integral structure.

Another object of the invention is to provide a pair of reflection members in the form of a beam splitter and a mirror mounted on a reflection carriage and a guide track to guide the carriage in direct rectilinear adjustment movement across the path of an image emitted by an image tube or the like.

Another object of the invention is to provide a carriage for supporting optic, TV, and cine-fluorographic viewing systems which carriage includes a housing supporting the camera over the image tube and in viewing alignment with the tube.

Another object of the invention is to provide a novel and improved viewing apparatus made in accordance with the foregoing objects wherein a single control handle is used to select either optic viewing, television viewing, or a combination optic and camera viewing.

A specialized object of the invention is to provide a mechanism in which the adjustment handle is connected to a control rod which extends through various linkage members and which rod is movable axially relative to the members, and wherein the rod has a plurality of projections which selectively engage such members for adjustment movement upon rotation of the rod.

Another object of the invention is to provide an adjustment mechanism wherein the members are all automatically locked in each adjustment position to assure maintenance of that position as the device is used.

Other objects and a fuller understanding of the invention may be had by referring to the following description and claims taken in conjunction with the accompanying drawings in which:

Figure 1:
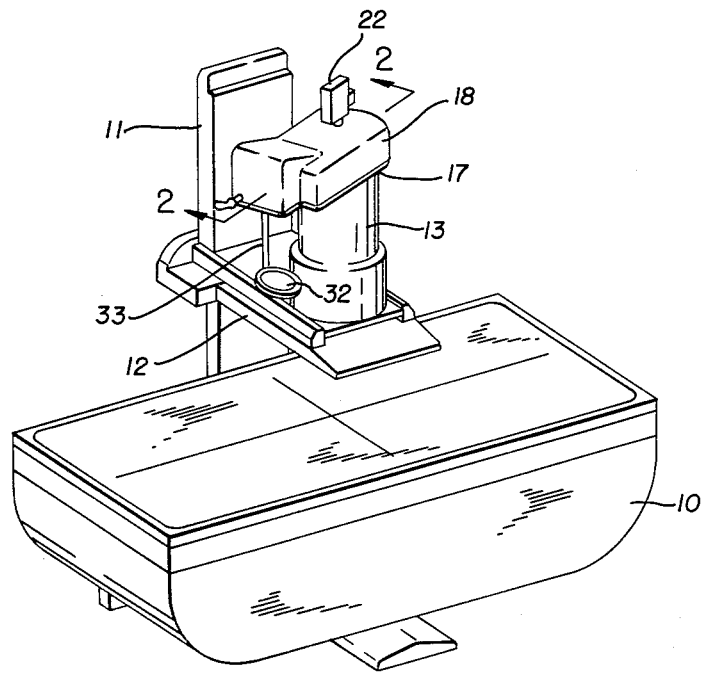
FIGURE 1 is a perspective view of an X-ray table equipped with an image amplification member and the novel and improved viewing system of this invention.

Referring to the drawings and to FIGURE 1 in particular, an X-ray table is shown generally at 10. This table may be of the taype taught in United States Patent No. 2,872,584, issued February 3, 1959, to Ralph C. Schiring and O. C. Hollstein. The table 10 includes the usual tower 11. A fluoroscopic carriage 12 is carried on the tower for rectilinear movement along the tower. This movement is vertical in the position shown in FIGURE 1. Since the table is a so-called "90–90" table which tilts in either direction to a vertical position, the relative movement of the fluoroscopic carriage 12 and the tower may also be horizontal or any other angle between the horizontal and vertical.

An image housing 13 is mounted on the fluoroscopic carriage 12. The housing 13 may be movable on tracks along the housing as taught in the above reference copending patent application, entitled "Combined Image Amplifier and Fluoroscopic Screen Above X-Ray Examination Table." The image housing 13 may carry the usual image amplification tube within it. The details of that tube are not shown here since they are well known, and since they are adequately disclosed in the copending patent application. For the present disclosure, it is sufficient to recognize that the image tube has an anode or output end 14, visible in FIGURES 2, 3 and 4.

A viewing system carriage 17 is mounted on the image housing 13. The viewing carriage 17 includes a top portion or housing 18 which, together with the base portion, to which the lead lines of the numeral 17 have been directed, define the entire viewing system carriage. The viewing carriage in its entirety, carries all of the three viewing systems with the exception, of course, of the viewing screens for the TV system and the conduits conducting impulses on those screens.

A suitable bearing 19 is interposed between the viewing carriage 17 and the image carriage 13 to permit facile relative rotation of the two carriages. A suitable adjustment lock 20 is mounted on one of the carriages, the image carriage 13 in the embodiment shown in the drawings, to lock the carriages in a selected relative position and thereby prevent relative rotation.

A camera 22 is mounted on the viewing housing portion 18. The camera 22 is a movie camera of the type used for cine-fluorography. These cameras are referred to generically in the X-ray industry as cine cameras. The cine camera 22 includes a lens system of the usual type shown schematically at 23. The camera lens system 23 is in axial alignment with the image housing 13 and the output end of the image tube 14.

A reflection body carrier 25 is provided. The carrier 25 is mounted on a slide guide which takes the form of a pair of parallel guide tracks 26. The guide tracks 26 are horizontally disposed in the drawings. The tracks 26 guide the carrier 25 in direct rectilinear adjustment movement. The carrier 25 supports a pair of reflection members in the form of a mirror 27, FIGURES 2 and 4, and a beam splitter 28, FIGURES 3, 4 and 6. With the mechanism in the position shown in solid lines in FIGURE 3, which is also the position of FIGURE 2, the mirror 27 is positioned in image transmitting alignment directly over the output end 14 of the image tube. This may be referred to as a pure optic position since only the optic system is in use when the mirror 27 is so positioned.

Figure 2:
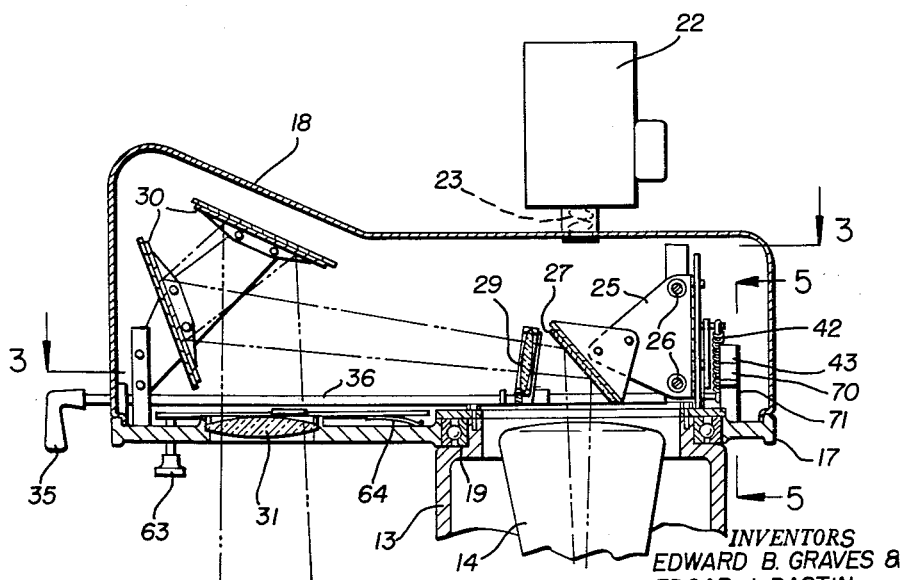
FIGURE 2 is a sectional view as seen from the plane indicated by the line 2—2 of FIGURE 1 showing a substantial part of the viewing system on an enlarged scale with respect to FIGURE 1.

The path of the beam image through the optic system image is shown with phantom lines in FIGURE 2. The beam travels from the image tube to the mirror 27 and thence through a first and adjustable lens 29. The image travels from the lens 29 to a pair of mirrors 30. The mirrors 30 are fixed mirrors which deflect the image through a transparent output member in the form of a lens 31. The output lens 31 is mounted in the base of the viewing carriage 17. An operator observable mirror 32 is supported by the viewing carriage 17 as by arm 33. The mirror 32 is adjustable relative to the arm 33 for the convenience of the operator. The mirror 32 receives the image from the output lens 31 and deflects it to the operator or other viewer.

Figure 3:
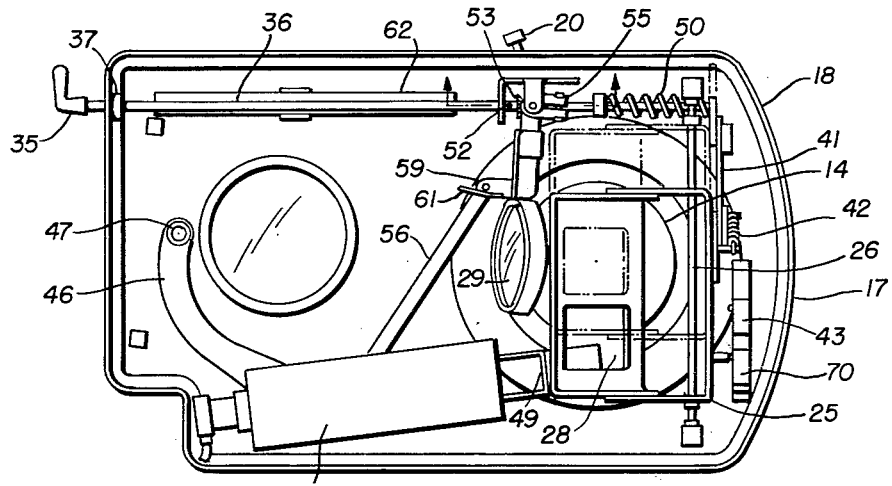
FIGURE 3 is a sectional view of the device as seen from the plane indicated by the line 3—3 of FIGURE 2, and on the scale of FIGURE 2 with the mechanism in one adjustment position.

The carrier 25 is shiftable from the position shown in solid lines in FIGURE 3 to the position shown in phantom. When the carrier 25 is in the position shown in phantom in FIGURES 3 and 5, and in solid lines in FIGURES 4 and 6, the beam splitter 28 is positioned directly over the image end 14. This position may be referred to as an optic-camera position since both may be used. With the beam splitter positioned over the output end 14, a portion of the light output is directed to the lens system 23 of the cine camera 22. Thus the system is in image transmitting alignment with the camera. The remainder of the output is reflected to the adjustable lens 29, and thence through the remainder of the optic system. In the preferred arrangement, approximately 95% of the light output of the image tube is passed to the camera. This provides sufficient light energy for the camera and, at the same time, directs the remaining 5% to the operator observable mirror 32.

The reflection carrier 25 thus carries two reflection bodies which are positionable selectively and one at a time over the image output. Thus, both the mirror 27 and the beam splitter 28 are part of the optic system. At the same time it can be said that either the beam splitter or the mirror is part of the optic system, since one is inoperative when the other is in use. The adjusting movement of the carrier 25 is accomplished by rotating an adjustment handle 35. The adjustment handle 35 is connected to the outer end of a rotatable and axially shiftable adjustment bar 36. The handle 35 and the bar 36, together with the mechanism they engage, provide an operative control selection means for shifting the chosen viewing system or systems into position.

Figure 5:
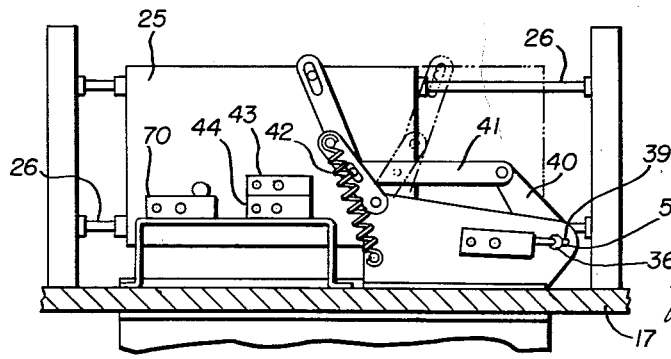
FIGURE 5 is a sectional view of a portion of the adjustment mechanism as seen from the plane indicated by the line 5—5 of FIGURE 2.

The adjustment bar 36 is supported at spaced locations 37 and 38. The bar supports 37 and 38 permit the rotative and axial adjustment movements of the bar. The adjustment bar 36 has a carrier drive pin 39 connected near its inner end. The carrier drive pin 39 selectively engages a carrier drive pivot link 40. The pivot link 40 is connected to a carrier drive linkage 41. Shifting of the carrier pivot link 40 and the linkage 41 to and from the position shown in solid and phantom in FIGURE 5, will shift the carrier 25 back and forth along the guide tracks 26. When the carrier 25 is in the position shown in solid lines in both FIGURES 3 and 5, the mirror 27 is, as has been noted, in alignment with the output from the image end 14. When the adjustment bar 36 is rotated clockwise, as seen in FIGURE 5, the pivot link 40 shifts from the position shown in solid lines to that shown in phantom. This pivoting of the link 40 shifts the connected linkage 41 and the carrier 25 from the position shown in solid lines in FIGURES 3 and 5, to the position shown in phantom. A carrier positioning spring 42 urges the linkage and the connected carrier fully into one position or the other because, as will be apparent, the spring 42 serves in an over-center fashion.

To facilitate the maintenance of a properly visible image in the operator observable mirror 32, a pair of microswitches 43, 44, which may be referred to as cine-microswitches, are activated by the adjustment of the carrier from the pure optic position to the optic-camera (or cine) position shown in phantom in FIGURES 3 and 5. The circuitry and operation will be described in detail below. Through this to-be-described circuitry the microswitches are connected through suitable conductors to the X-ray tube to increase the intensity of the emitted X-ray beam, when both the camera and the optic system are being used. Through the automatic actuation of the microswitch, therefore, there is substantially no discernible difference between the operator observable image when the mechanism is in pure optic position or the optic-cine position. Further, the automatic increase in intensity assists in obtaining proper photographic images of the image output emitted by the output end 14.

An electronic image transmission pickup member 45 is provided. This electronic pickup member may be referred to as a television pickup, or simply as a TV pickup member. The TV pickup member 45 has an extension arm 46 which is pivotally connected at 47 to the base of the carriage 17. This pivotal connection of the extension arm 46 permits the television pickup member 45 to be adjustably and selectively shifted from a storage position shown in FIGURE 3, to a pickup and image transmission position shown in FIGURE 4. The pickup position is also shown in FIGURE 6.

In addition to the compactness of the unit, there are several reasons for the particular arrangements of image and storage position. It is believed that there is little need for an optic system when the television system is in use. Further, a TV system is far more acceptable if it obtains all of the image output. Previous attempts at utilizing both the cine camera and a TV pickup simultaneously have not proved satisfactory because there is not sufficient image energy present for proper operation of both. The recognition of these factors has led to one of the principal and major advantages of this invention. Through this invention, not only the performance of each of the three viewing systems superior to the prior known arrangements, but also the mechanism is highly compact, light weight, and easy to use.

Figure 4:
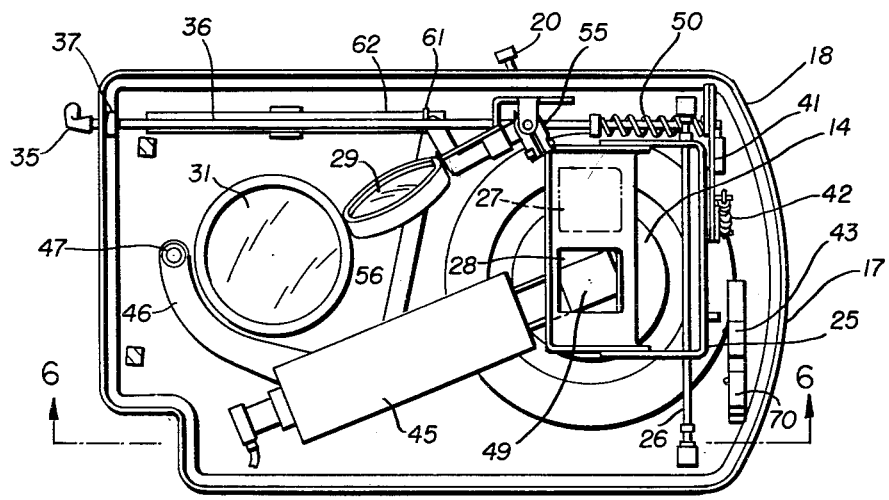
FIGURE 4 is a view corresponding to FIGURE 3, showing the mechanism in another adjustment position.
Figure 6:
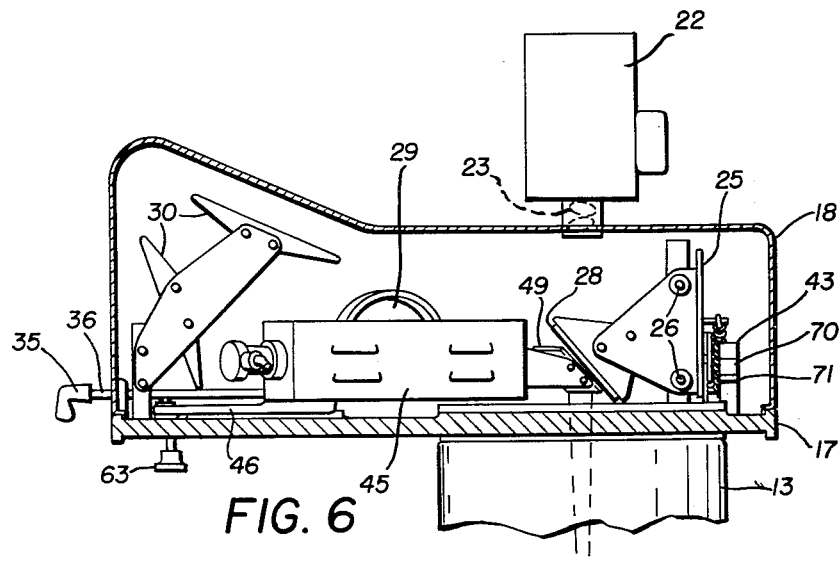
FIGURE 6 is a sectional view of the device as seen from the plane indicated by the line 6—6 of FIGURE 4.

To obtain these advantages, a pickup end 49 of the TV member 45 is positioned directly over the image end 14 when the TV member is in the pickup position of FIGURE 4 and FIGURE 6. The pickup end 49 is positioned to absorb all of the output of the image 2. The pickup end of 49 is positioned between the image end 14 and the carrier 25 to accomplish this exclusive pickup. Thus, the pickup 49 blocks both the optic system and the cine camera from receiving any part of the image output at the time when the television system is in operation.

One of the factors which contributes to the high success of this device is that it is not possible to shift the TV mechanism into pickup position until the beam splitter 28 is positioned over the image end 14. With a minimum adjustment, it is possible to shift from either pure optic or TV to optic-cine. Thus, the mechanism is shifted to camera at any instant with a minimum of lost time.

To accomplish these guide adjustments, a spring 50 is positioned around the bar 36 urging it outwardly to its normal position shown in FIGURES 2 and 3. In this position the carrier can be shifted back and forth for its adjustments. When the carrier is in the pure optic position, the bar 36 may be shifted axially to the right, as seen in FIGURES 2, 3, 4, 6 and 7. This axial shifting causes the pin 39 to pass through slot 51 in the bar support 38. The pin 39, of course, comes out of engagement with the pivot bar 40 before it passes through the slot 51. At the same time, a TV and optic adjustment pin 52 passes into engagement with a bevel gear 53. Rotation of the handle 35 when the pin 52 is in engagement, rotates the bevel gear 53 and a complemental bevel gear 54. The complemental bevel gear 54 is connected to a movable lens bracket 55 which supports the adjustable lens 29. The movable lens bracket 55 is also connected to the TV pickup 45 through a linkage arm 56. The rotation of the complemental bevel gear 54 rotates the adjustable bracket 55. Rotation of the adjustable bracket 55 will shift the movable lens 29 from the optic viewing and image transmission position shown in FIGURE 3, to the storage position shown in FIGURES 4 and 6. Simultaneously this bevel gear rotation causes the bracket 55 to pull the link 56. Pulling of the link 56 causes the pickup member 45 to pivot around the axis 47 and shift the TV member from its storage position of FIGURE 3 to its pickup and image transmission position of FIGURES 4 and 6. Counter rotation of the adjustment bar 36 will obviously shift the TV pickup back to its storage position and the adjustable lens 29 to its optic position. The action of the bar spring 50 will then shift the bar from the TV adjustment position of FIGURE 4 back to the carrier adjustment position of FIGURE 3.

The mechanism is uniquely designed so that it is locked in each of its adjustment positions. The action of the over-center carrier spring 42 has previously been described. This holds the carrier 25 in a selected position. The TV pickup 45 and the adjustable lens 29 are held in the position of FIGURE 3 by a slightly over-center action which shifts a pivot point 59 at the connection of link 56 and the bracket 55, past a plane defined by the axis of rotation of the bracket 55 and the axis of the connection between the linkage arm 56 and the pickup 45.

A latch 61 carried by the linkage 56 engages a lock bar 62 when the TV member is in the pickup position of FIGURE 4. This locks the mechanism in the TV pickup position. A button 63 may be depressed to cause the lock bar 62 to pivot downwardly and disengage the latch 61 when it is desired to shift the TV pickup from the pickup position to the storage position. A suitable spring 64 normally urges the lock bar 62 into its latch engaging position.

*Electric circuits*

As has previously been indicated, it is necessary to control the output of an X-ray tube 66 in order to have the appropriate X-ray beam density for each of the three adjustment positions. The X-ray tube 66 is controlled by varying the power input to an X-ray tube filament transformer 67. In addition, a kilo voltage meter 68 is provided to assist an operator of the machine.

The kilo volt meter 68, like the tube 66 and the filiment transformer 67, may be of any of the usual and well known constructions. Usually such a meter will have a high and a low range for measuring relatively high and relatively low voltage respectively. When the mechanism of the invention is in either the optic or the TV positions, a relatively low voltage is preferred. When the mechanism is in the cine position, a high voltage is present. Accordingly, a means must also be provided to shift the kilo volt meter 68 from a low to a high range.

An optic microswitch 70 is mounted adjacent the cine microswitches 43, 44. These three switches, 43, 44 and 70, are all mounted on a bracket 71. The bracket 71 may be connected to the base of the viewing carriage 17. The switches 43, 44 are all actuated by the reciprocal movement of the reflection carrier 25. A TV microswitch 72 is also mounted on the base of the viewing carriage 17. The TV switch 72 is actuated by axial movement of the adjustment bar 36.

Figure 8:
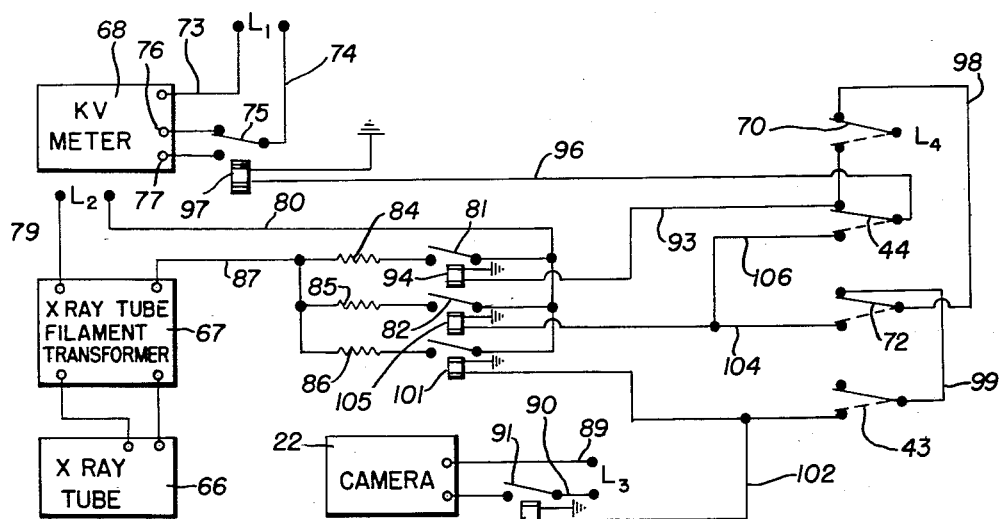
Figure 7:
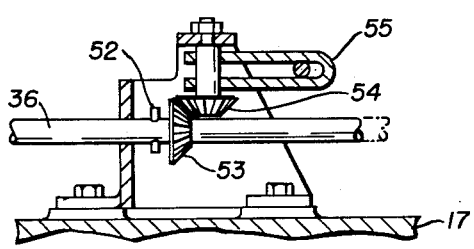
FIGURE 7 is an enlarged sectional view showing a part of the adjustment mechanism as seen from the plane indicated by the line 7—7 of FIGURE 3; and, FIGURE 8 is a somewhat schematic wiring diagram of the circuits controlled by this mechanism.

FIGURE 8 is a somewhat schematic showing of the circuitry which is controlled by the microswitches which are controlled by the adjustment movements of this device. The four microswitches 43, 44, 70 and 72 are all single throw, double pole switches which are shown in their "normal" positions. The showing of all four switches in the "normal" positions represents, as will become apparent, a combination of positions which is only accomplished during adjustment movement. When the mechanism is in any one of the three viewing positions, at least one of these swtiches will be moved a position represented by a dotted line in each case.

The kilo meter 68 is shown as connected to a source of electric potential L–1 by conductors 73, 74. A single throw, double pole solenoid actuated switch 75 is in series with the conductor 74 so that either a high range 76 or a low range 77 of the meter 68 is activated.

The filament transformer 67 is supplied through conductors 79, 80 from a source of electric potential L–2. The conductor 80 is connected to three parallel, normally open, solenoid actuated switches 81, 82 and 83. The switches 81, 82 and 83 are series connected to resistors 84, 85 and 86 respectively. The resistors 84, 85, 86 are, in turn, connected through conductor 87 to the transformer 67.

A source of electric potential L–3 is connected through conductors 89, 90 to the camera 22. A single throw switch 91 is series connected to the conductor 90 to selectively complete close the circuit between the source L–3 and the camera 22.

When the carrier 25 is shifted to the optic position, the switch 70 is shifted from the position shown in solid lines in FIGURE 8, to the dotted line position. With the switch 70 in the dotted line position, a source of electric potential L–4 is connected through conductors 92, 93 to a relay 94. The relay 94 may be connected to ground to complete the circuit.

Actuation of the relay 94 closes the switch 91 to activate the filament transformer 67 with the resistor 84 in series with it. The resistor 84 is of an appropriate size to provide filament current of a proper level for optic viewing. When the switch 70 is in the dotted line position, electric current passes through the conductor 92 and the switch 44 to and through conductor 96 which is connected to a relay 97. Actuation of the relay 97 moves the throw of the switch 75 to actuate the low range 77 of the meter 68.

Shifting of the carrier 25 from the optic position to the cine position will cause the switch 70 to return to the position shown in solid lines. It will also shift the switches 43, 44 from the positions shown in solid lines to the positions shown in dotted lines. With the carrier in the cine position, the source of electric potential L–4 passes through the switch 70 and a conductor 98 to the TV switch 72. Current passes through this TV switch 72 and conductor 99 to the first camera or cine switch 43.

The current passes from the cine switch 43 through a conductor 100 to a relay 101. The relay 101 closes the switch 83 to complete the circuit to the filament transformer 67 through the resistance 86. The resistance 86 is selected to provide an appropriate and substantial transformer output for the cine position.

When the switch 43 is in the dotted line position, current also passes through a conductor 102 to a relay 103. The relay 103 closes the switch 91 to start the camera 22.

The switch 44 moves to its dotted line position at the same time as the swtich 43, however, since the switch 70 and the switch 72 are in their solid line positions, movement of the switch 44 from its solid to dotted line position has no immediate effect on the flow of electricity. This movement of the switch 44, in effect, readies the mechanism for change from the cine to the TV positions.

When the adjustment bar 36 is shifted axially to the TV position, the TV switch 72 is shifted from the position shown in solid lines in FIGURE 8, to the dotted line position. With the mechanism in the TV position, the circuits actuating the relays 101, 103 are broken, even though the switch 43 is still in the dotted line position. This is true because current is supplied to them through the conductors 98, 99 only when the switch 72 is in its solid line position.

With the switch 72 in the dotted line position, current passes from the conductor 98 through the switch 72, and a conductor 104, to actuate a relay 105. The relay 105 closes the switch 82 to place the resistor 85 in series with the filament transformer 67. With the switch 72 in the dotted line position, current also passes through the conductor 104 and a conductor 106, to the switch 44 and thence through the conductor 96 to reactivate the relay 97. This will again put the meter 68 in the low range position.

While the invention has been described with a great deal of detail, it is believed that it essentially comprises an improvement in an X-ray device having an image amplifying means which improvement includes a cine camera and optic system, and a television system, and in which the television system has a pickup selectively positionable between the image receiving portion of the other systems.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In an X-ray device including an amplifying image means having an output end, the improvement which comprises a viewing carriage connected to the image means, a camera mounted on the carriage and aligned with the image means output end, an optic system mounted on the carriage for directing an image to an operator observable position, an optical image carrier member reciprocably mounted on the carriage and supporting mirror and beam splitter reflection bodies, the carrier member having an optic position with the mirror positioned between the output end and the camera and forming a part of the optic system, the carrier member having a second position with the beam splitter positioned between the output end and the camera and forming a part of the optic system, an electronic pickup member pivotally mounted on the carriage and shiftable to and from storage and pickup positions, the pickup member having an image receiving portion between said output end and the positioned one of said reflection bodies when the electronic member is in the pickup position and operator controlled selection means operably connectable to said members to shift each of said members into selected positions.

2. The device of claim 1 wherein the optic system includes a lens pivotally mounted on the carriage and wherein the lens has a storage position and an image transmission position in alignment with the positioned one of said reflection bodies, and wherein the lens is in the image transmission position when the electronic member is in the storage position and the lens is in the storage position when the electronic member is in the pickup position.

3. The device of claim 1 wherein a guide track is provided and disposed transversely of a path defined by the output emitted from said output end and wherein said optical image carrier member is mounted on said guide track.

4. In an X-ray device having an image producing and amplifying system the improved combination which comprises a carriage, an X-ray image producing means secured to the carriage, an optical image transmission means mounted on the carriage for transmitting an image from the image producing means to an operator observable position, electronic image transmission pickup means mounted on the carriage and having an image receiving portion alignable with said image producing means, a cine type camera connected to the carriage and positionable to receive and record an image emitted by the image producing means, an operator controlled selection means operably connected to at least one of said mentioned means to position said pickup means and said optic means relative to said image means to align said image means with a selected one of said pickup means and said optic means, said selection means also selectively forming an image transmitting connection between the image means and the camera when the optic means is aligned with the image means.

5. The device of claim 4 wherein said electronic means image receiving portion absorbs substantially all of said image output when in alignment with said image means.

6. The device of claim 4 wherein said selection means includes an optic carrier having a beam splitter and a mirror, and wherein the mirror and the beam splitter are selectively positionable one at a time over the image means to form a part of the optic means and wherein the mirror directs all of the output of said image means through the optic means and wherein the beam splitter directs a selected portion of the image output to the camera and the remainder to the optic means.

7. In an X-ray device having image amplifying means, optic means, and cine camera means to receive the output emitted at one end of said amplifier, the improvement which comprises a television pickup connected to said amplifier, said pickup having an image receiving end, the pickup having a storage position out of the path of such amplifier output, the pickup also having an image position with the image receiving end positioned between the output end of the amplifier and said optic and cine means and operator controlled means to shift the pickup selectively from one position to the other.

8. In an X-ray device the improvement which comprises an image amplifier having an output end for emitting an image, a carriage connected to the amplifying member, a slide guide connected to the carriage and having a plurality of slide tracks disposed transversely of the axis of the amplifying member, an image reflection carrier mounted on the tracks for rectilinear reciprocative movement across the path of a beam emitted from said output end, a mirror element and a beam splitter element mounted in side by side relationship on said carrier and selectively positionable in the path of such beam, the carrier being in a visual observation position when the mirror is in the path of said beam, the carrier being in a cine position when the beam splitter is in the path of said beam, a television pickup pivotally connected to the carriage and having storage and image positions, the pickup having an image receiving end portion positioned between said output end and said carrier when the pickup is in said image position, a housing mounted on said carriage and covering said slide guide and said pickup, a cine camera connected to said carriage and disposed at least in part on the outside of said housing, said camera having a lens in the path of said beam, an optical transmission system for transmitting an image reflected by a positioned one of said elements to an operator observable position, said system including a pivotally mounted lens having transmission and storage positions, an operator controlled linkage including a rotatable shaft and a pair of spaced actuation projections, said linkage also including a pivot actuation portion connected to said lens and said pickup, one of said projections being selectively engageable with said carrier to shift the carrier selectively from the visual observation position to the cine position ad return, said shaft being longitudinally shiftable to shift the other of said projections into engagement with the pivot actuation portion when the carrier is in the visual observation position only, said lens being shiftable from the transmission to the storage position and the pickup being simultaneously shiftable from the storage to the image position, said lens being shiftable from the storage to the transmission position and the pickup being simultaneously shiftable from the image to the storage position, said shaft being rotatable when said other projection is in engagement with said pivot actuation portion to move said portion and thereby cause said lens and pickup simultaneous movement to and from the respective storage position, and latch means releasably engageable with said pickup when the pickup is in said image position to lock said pickup in position.

9. In an X-ray device the improvement which comprises an image amplifier having an output end for emitting an image, a carriage connected to the amplifier, a slide guide connected to the carriage and having a pair of slide tracks disposed transversely of the axis of the amplifier, an image reflection carrier mounted on the tracks for rectilinear reciprocative movement across the path of a beam emitted from said output end, a mirror and a beam splitter mounted in side by side relationship on said carrier and selectively positionable one at a time in the path of such beam, the carrier being in a visual observation position when the mirror is in the path of said beam, the carrier being in a cine position when the beam splitter is in the path of said beam, a television pickup pivotally connected to the carriage and having storage and image positions, the pickup having an image receiving end portion positioned between said output end and said mirror when the pickup is in said image position, a housing mounted on said carriage and covering said slide guide and said pickup, a cine camera mounted on said housing and in the path of said beam, an optical transmission system for transmitting an image reflected by the positioned one of said mirror and beam splitter to an operator observable position, said system including a pivotally mounted lens having transmission and storage positions, an operator controlled linkage including a rotatable shaft and a pair of spaced actuation projections, said linkage also including a pivot actuation portion connected to said lens and said pickup, one of said projections being selectively engageable with said carrier to shift the carrier selectively from the visual observation position to the cine position and return, said shaft being longitudinally shiftable to shift the other of said projections into operative engagement with the pivot actuation portion when the carrier is in the visual observation position only, said shaft being rotatable when in operative engagement with said pivot actuation portion to shift both the lens and the pickup from one position to the other, said lens being shiftable from the transmission to the storage position and the pickup being simultaneously shiftable from the storage to the image position, said lens being shiftable from the storage to the transmission position and the pickup being simultaneously shiftable from the image to the storage position, a latch engageable with said pickup when the pickup is in said image position to lock said pickup in such position, and an operator controlled release operatively connected to said latch for disengagement of the latch and pickup.

10. The device of claim 9 wherein a plurality of switches are secured to the carriage and positioned for selective actuation when the carrier, the lens and the pickup are adjustable shifted and wherein said switches are connected to an X-ray control means to vary the ray energy output of an X-ray tube according to the positions of the shiftable lens, carrier and pickup.

11. In an X-ray device including an image amplifier having an output end the combination of, an optic system connected to the amplifier and including an adjustable member, a cine camera connected to the amplifier and aligned with the output end, a television pickup member movably connected to the amplifier, each of the members having a storage position and an image transmission position, and operator controlled adjustment means operatively connected to the members to shift one of the members selectively from the image transmission position to the storage position and simultaneously shift the other of the members from the storage position to the image position, and said television pickup member when in the image position including a portion disposed between said output end and said camera.

12. In an X-ray device including an image intensification tube disposed within a housing and having an output end, the combination of, a pickup carriage mounted on the housing adjacent the output end, a reflection carrier movably mounted on the carriage, a beam splitter and a mirror mounted on the carrier and movable therewith, the splitter and mirror being selectively positionable one at a time in a reflection position over the output end, a television pickup movably carried by the carriage and having a storage position and a pickup position between the output end and such reflection position, a camera mounted on the carriage in alignment with the output end and with such reflection position between the camera and the output end, and an optic system on the carriage and positioned to receive and transmit an image reflected by the selected one of the mirror and splitter in such reflection position.

13. The device of claim 12 wherein the carriage is rotatably mounted on the housing and a releasable lock is interposed between the two to maintain them in a selected position.

References Cited in the file of this patent

UNITED STATES PATENTS

| | | |
|---|---|---|
| 2,739,257 | Sheldon | Mar. 20, 1956 |
| 2,857,523 | Corso | Oct. 21, 1958 |